(12) United States Patent
Ahlbom et al.

(10) Patent No.: US 6,222,487 B1
(45) Date of Patent: Apr. 24, 2001

(54) SYSTEM AND METHOD FOR MEASUREMENT

(75) Inventors: Sten Ahlbom; Ragner Arvidsson, both of Västra Frölunda; Bengt Andersson, Kullavik, all of (SE)

(73) Assignee: Telefonaktiebolaget LM Ericsson, (Publ),, Stockholm (SE)

( * ) Notice: Subject to any disclaimer, the term of this patent is extended or adjusted under 35 U.S.C. 154(b) by 0 days.

(21) Appl. No.: 09/347,118

(22) Filed: Jul. 2, 1999

(30) Foreign Application Priority Data

Jul. 2, 1998 (SE) .................................................... 9802364

(51) Int. Cl.$^7$ ...................................................... G01S 5/20
(52) U.S. Cl. ............................. 342/462; 342/42; 342/46; 342/59; 342/118; 342/120; 342/450; 342/463; 342/465
(58) Field of Search ............................ 342/42, 43, 46–51, 342/118, 120–127, 59, 450, 451, 458, 462–465

(56) References Cited

U.S. PATENT DOCUMENTS 3,286,263 * 11/1966 Hammack ............................ 342/463
5,596,313 * 1/1997 Berglund et al. ................. 342/126 X

FOREIGN PATENT DOCUMENTS

| 1 926 221 | 11/1970 | (DE) . |
| 4 036 342 | 3/1992 | (DE) . |
| 0 743 535 | 11/1996 | (EP) . |
| 2 735 583 | 1/1996 | (FR) . |

OTHER PUBLICATIONS

English Abstract of Japanese Patent Application 58–184563, Published 10/28/83; Patent Abstracts of Japan, (vol. 8, No. 31, p–253).

* cited by examiner

Primary Examiner—Bernarr E. Gregory
(74) Attorney, Agent, or Firm—Burns, Daone, Swecker & Mathis, L.L.P.

(57) ABSTRACT

A method and a system for determining an altitude of an object of interest, for example, an airplane that transmits electromagnetic radiation in the form of radar signals. A number of sub-units that can detect the radar signals are spread out in an area, preferably in a large geographical area, where the radar signals of the airplane/object it is possible to detect. The sub-units communicate to the information center when they are able to detect the radar signals. The information center determines the altitude of the airplane based on the airplanes line of sight, i.e., its radar horizon, and thus which sub-units can detect the radar signals.

19 Claims, 8 Drawing Sheets

SYSTEM AND METHOD FOR MEASUREMENT

BACKGROUND

The present invention relates generally to a method of and a system for altimetry, especially passive distant altimetry of an object.

The method used to measure the height of an object above, for example, ground or sea level will depend on, among other things, the spatial relationship the measurement means has with the object whose height is to be measured. If the measurement means is located at the object, i.e. is airborne, then the height can be measured passively by an air pressure gage or actively by radar means, for example an altimetry radar. On the other hand, if the measurement means is located on, for example, the ground separated from the object, then the height to the object can be measured actively by a simple altimetry radar if located directly underneath the object or if not, by a more complex altimetry radar, as both the distance and elevation to the object of interest has to be measured.

The present invention concerns the measurement of the height from, for example, the ground to an object by measurement means located, for example, arbitrarily on the ground. Such altimetry measurements, as previously mentioned, usually require expensive and complicated equipment such as altimetry radar equipment. An altimetry radar is an active device that transmits radar pulses, which is not always a desirable feature.

SUMMARY

An object of the invention is to define a method for providing a cost effective manner of measuring the altitude of an object passively.

Another object of the invention is to define a cost effective system for passively measuring the altitude of an object.

The above-mentioned objects are achieved in accordance with the invention by a method and a system for determining an altitude of an object of interest. The object of interest can, for example, be an airplane that transmits electromagnetic radiation in the form of radar signals. A number of sub-units that can detect the radar signals are spread out in an area, preferably in a large geographical area, where the radar signals of the airplane/object is possible to detect. The sub-units are associated with at least one information centre with which they can communicate. The sub-units communicate to the at least one information centre when they are able to detect the radar signals. The at least one information centre determines the altitude of the airplane based on the airplanes line of sight, i.e. its radar horizon, and thus which sub-units can detect the radar signals. By ranking the sub-units as to what altitude the airplane would have if the sub-units just barely can detect the radar signals, the at least one information centre determines the airplanes altitude by determining which sub-unit with the maximum line of sight altitude can detect the radar signals and by determining which sub-unit that cannot detect the radar signals have the lowest line of sight altitude.

The aforementioned objects are also achieved according to the invention by a method of determining an altitude, in relation to a predetermined altitude reference level, of an object that emits electromagnetic radiation. The predetermine altitude reference level can advantageously be the sea level. The method involves at least one information centre being in communication with a plurality of sub-units. The sub-units comprises passive electromagnetic radiation sensors. According to the invention the method comprises a number of steps in each sub-unit. A first step of sensing electromagnetic radiation by means of the passive electromagnetic radiation sensors. A second step of determining if electromagnetic radiation is sensed. And, if it is determined that electromagnetic radiation is sensed, then in a third step communicating to the at least one information centre that electromagnetic radiation has been sensed. According to the invention the method further comprises a number of steps in the at least one information centre. A first step of determining the spatial coordinates of the sub-units. A second step of receiving communication from sub-units that they have sensed electromagnetic radiation. A third step of determining the surface coordinates of the object. And a fourth step which in dependence on which sub-units have communicated that they have sensed electromagnetic radiation, determines in relation of a predetermined level an altitude of the object.

Suitably the method advantageously also in the at least one information centre, further comprises the step of determining the line of sight horizon altitudes, in relation to the determined surface coordinates of the object, of each sub-unit, based on the respective determined spatial coordinates of each sub-unit. And also comprises further the step of ranking the sub-units according to the determined line of sight horizon altitudes, which ranking is consequently used in the step of determining the altitude of the object.

Preferably in the method in the at least one information centre the step of determining an altitude of the object comprises the step of determining a minimum altitude of the object. This is accomplished by determining which sub-unit or sub-units that have sensed electromagnetic radiation are just within the line of sight horizon of the object.

Advantageously the method in the at least one information centre further comprises the step of rejecting sub-units at determined spatial coordinates that are unsuitable for the object in question at the determined surface coordinates in question. The reason for rejection can, for example, be due to the local terrain. The rejected sub-units are not to be taken into any further consideration for the object in question at the determined surface coordinates in question.

Each sub-unit can further also suitably comprise the step of classifying sensed electromagnetic radiation according to one or more of either the frequencies, pulse modulation, pulse repetition frequency, pulse length, or sensed level. This will imply that in the step of communicating to the at least one information centre the classification of the sensed electromagnetic radiation is also communicated, and in that in the at least one information centre that the step of determining an altitude of an object is only done in dependence on sub-units that have communicated that they have sensed electromagnetic radiation with at least substantially the same classification.

Suitably the method in the at least one information centre further comprises the step of determining a maximum altitude of the object by determining which sub-unit or sub-units within a sector that the object emits electromagnetic radiation are beyond the line of sight horizon of the object. It will then be advantageous if the method in the at least one information centre further comprises the step of determining the sector that the object emits electromagnetic radiation in by setting limits of the sector in view of which sub-units have communicated that they have sensed electromagnetic radiation.

In some versions each sub-unit suitably further comprises the step of measuring sensed electromagnetic radiation for the purpose of determining the surface coordinates of the object. Typically the time of arrival (TOA) of the sensed electromagnetic radiation is measured. The step of communicating to the at least one information centre, will then also communicate the result of measuring sensed electromagnetic radiation for the purpose of determining the surface coordinates of the object as measured values. The method in the at least one information centre then suitably also comprises, in the step of determining the surface coordinates of the object, using the communicated measured values from the sub-units in combination with the determined spatial coordinates of the sub-units for determining the surface coordinates of the object.

The aforementioned objects are also achieved by a system of determining an altitude, in relation to a predetermined altitude reference level, of an object that emits electromagnetic radiation. The system comprises at least one information centre and a plurality of sub-units associated with the at least one information centre. The at least one information centre and the sub-units comprise communication means which can transfer information from each one of the sub-units to the at least one information centre. The sub-units further comprise passive electromagnetic radiation sensors. According to the invention each sub-unit comprises determination means which is arranged to determine if the passive electromagnetic radiation sensor has sensed any electromagnetic radiation. If it is determined that electromagnetic radiation has been sensed then the communication means communicates to the at least one information centre that electromagnetic radiation has been sensed. The at least one information centre, via the communication means, receives communication from sub-units that they have sensed electromagnetic radiation. The at least one information centre further comprises a sub-unit spatial coordinate determination means, an object surface coordinate determination means, and an altitude determination means. The sub-unit spatial coordinate determination means is arranged to determine the spatial coordinates of the sub-units. The object surface coordinate determination means is arranged to determine the surface coordinates of the object. And the altitude determination means is arranged to, in dependence on which sub-units have communicated that they have sensed electromagnetic radiation, determine in relation of a predetermined level an altitude of the object.

The at least one information centre can suitably further comprise line of sight determination means arranged to determine for each sub-unit the line of sight horizon altitude, in relation to the determined surface coordinates of the object. Suitably the at least one information centre comprises ranking means arranged to rank the sub-units according to their determined line of sight horizon altitudes, which ranking is consequently used in the altitude determination means.

In the at least one information centre, the altitude determination means is advantageously further arranged to determine a minimum altitude of the object by determining which sub-unit or sub-units that have sensed electromagnetic radiation are just within the line of sight horizon of the object.

Suitably the at least one information centre further comprises sub-unit rejecting means arranged to reject sub-units at determined spatial coordinates unsuitable for the object in question at the determined surface coordinates in question. The sub-unit rejecting means rejects these sub-units at determined spatial coordinates from being taken into any further consideration for the object in question at the determined surface coordinates in question.

In some embodiments of the invention each sub-unit further comprises classification means arranged to classify sensed electromagnetic radiation according to one or more of either the frequencies, pulse modulation, pulse repetition frequency, pulse length, or sensed level. Suitably the sub-unites also communicates, to the at least one information centre, the classification of the sensed electromagnetic radiation. Advantageously the altitude determination means in the at least one information centre is only arranged to determine an altitude of an object in dependence on sub-units that have communicated that they have sensed electromagnetic radiation with at least substantially the same classification.

In other embodiments the altitude determination means in the at least one information centre is further arranged to determine a maximum altitude of the object by determining which sub-unit or sub-units within a sector that the object emits electromagnetic radiation are beyond the line of sight horizon of the object. The at least one information centre can then suitably further comprise sector determination means arranged to determine the sector that the object emits electromagnetic radiation in, by setting limits of the sector in view of which sub-units have communicated that they have sensed electromagnetic radiation.

In some versions of the invention the altitude determination means of each sub-unit further comprises measuring means arranged to measure sensed electromagnetic radiation for the purpose of determining the surface coordinates of the object. Suitably the sub-unit also communicates the result of measured sensed electromagnetic radiation for the purpose of determining the surface coordinates of the object. Advantageously the object surface coordinate determination means in the at least one information centre uses the communicated result of measured sensed electromagnetic radiation from the sub-units and the determined spatial coordinates of the sub-units when determining the surface coordinates of the object. For example, the sub-units can measure the time of arrival (TOA) of the electromagnetic radiation, such as radar signals, and be grouped in pairs or include two sensors each for determination of the direction to the object. Several sub-unit pairs and/or sub-units with two sensors can then pinpoint the surface coordinates of the object by means of the at least one information centre.

By providing a method and a system for passive altitude measurements of an object, such as an airplane, that emits electromagnetic radiation, such as radar signals, a plurality of advantages over prior art systems are obtained. The system is unobtrusive in that it is a passive system. The sub-units used are simple and can be mass produced at a low cost.

BRIEF DESCRIPTION OF THE DRAWINGS

The invention will now be described in more detail for explanatory, and in no sense limiting, purposes, with reference to the following figures, in which.

DETAILED DESCRIPTION

In order to clarify the system according to the invention, some examples of its use will now be described in connection with FIGS. 1 to 9.

Figure 1:
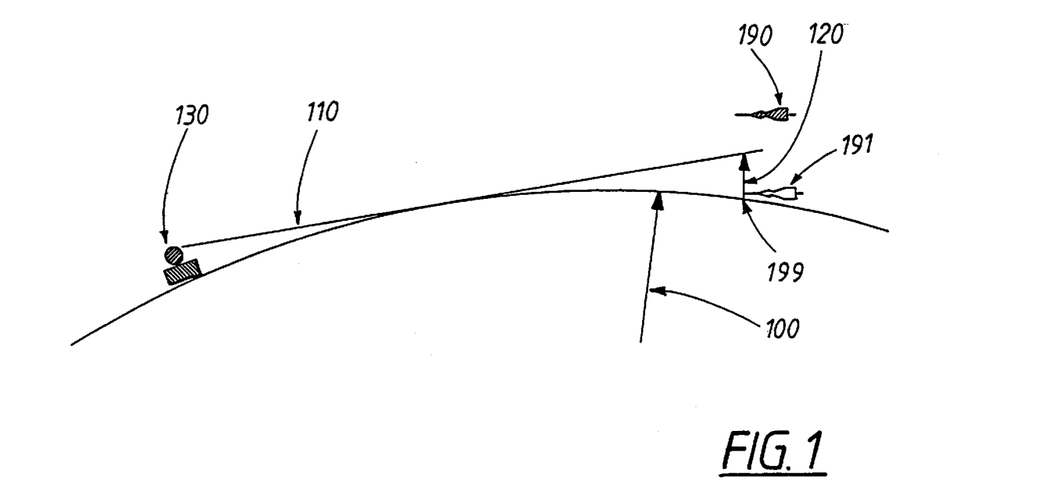
FIG. 1 illustrates a diagram of the basic principles of the invention.

FIG. 1 illustrates a diagram of the basic principles of the invention. A prerequisite of the invention is that an airplane 190, 191, i.e. an object of interest, emits electromagnetic radiation that a sensor in a sub-unit 130 can detect. The electromagnetic radiation will hereafter be referred to as radar signals, as most airplanes some sort of radar that emits radar signals in the microwave electromagnetic frequency range. By using a plurality of passive sensors in the form of sub-units 130 associated with an information centre, the altitude 120 of an airplane 190, 191 can be determined, at least approximately. The accuracy of the altitude determination will, among other things, depend on the number of sub-units 130 used and their relative mutual distances. The sensors should preferably have a wide beam width and the sub-units 130 should be spread out geographically. In a basic configuration, the surface coordinates of the airplane are determined by the information centre either by means of the sub-units, see below, or for example by means of a radar. Surface coordinates indicate the latitude and longitude of an object, i.e. the X and Y coordinates, while spatial coordinates indicate the spatial location of an object, latitude, longitude, and altitude, i.e. the X, Y, and Z coordinates. The spatial coordinates of the sub-units 130 are either predetermined, for example fixed location, or communicated to the information centre, for example mobile sub-units comprising a GPS-location device.

FIG. 1 shows two airplanes 190, 191, a first airplane 190 that the sub-unit 130 can detect, and a second airplane 191 that the sub-unit 130 cannot detect. The sub-unit 130 is beyond the radar horizon of the second airplane 191, or seen from the other end, the first airplane 190 is above a line of sight 110 and can thus be seen and the second airplane 191 is below a line of sight 110 and thus cannot be detected. The Radar horizon will ideally depend on the distance between the sub-unit 130 and the airplane 190, 191 in question, the altitude of the airplane, the altitude of the sub-unit 130, and the curvature of the earth indicated by the radius 100, all previously determined except the altitude of the airplane. The basic principle of the invention is thus that if a sub-unit 130, at determined spatial coordinates, does not detect any radar signal, then the altitude of an airplane 191, at determined surface coordinates 199, is less than the sub-unit's 130 line of sight 100 altitude 120 at those surface coordinates. Further according to the invention, if a sub-unit 130 at determined spatial coordinates can detect a radar signal, then the altitude of an airplane 190, at determined surface coordinates, is just equal to or higher than than the sub-unit's 130 line of sight 100 altitude 120 at those surface coordinates.

Figure 2:
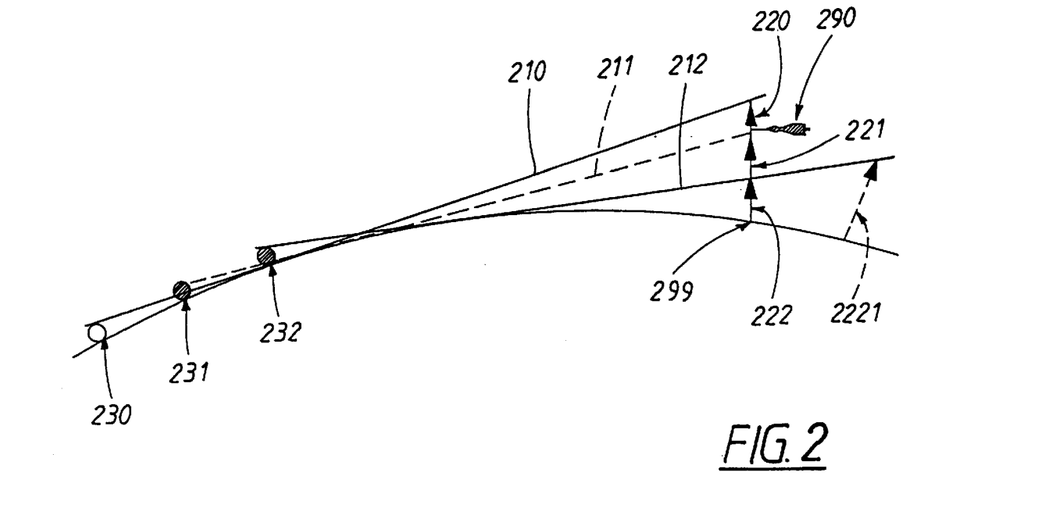
FIG. 2 illustrates a diagram of a system according to the invention.

FIG. 2 illustrates a diagram of a system according to the invention with a plurality of geographically spread out sub-units 230, 231, 232 to further illustrate the principal of the invention. In the example two sub-units 231, 232 are able to detect a radar signal from an airplane 290 and one sub-unit 230 is not able to. All three sub-units are illustrated with their line of sights 210, 211, 212 and their corresponding line of sight altitudes 220, 221, 222 at the surface coordinates of the airplane 290. Also illustrated is a second line of sight altitude 2221 for one of the sub-units 232, which shows how important it is that the correct surface coordinates are used for which an altitude is desired. A first sub-unit 230 is beyond the radar horizon of the airplane 290 and cannot detect any radar signals from the airplane 290, i.e. the airplane 290 is below the first sub-unit's 230 line of sight altitude 220 at the airplane's surface coordinates 299. A second sub-unit 231 is within the radar horizon of the airplane 290 and can detect radar signals from the airplane 290, i.e. the airplane 290 is above or just equal to the second sub-unit's 231 line of sight altitude 221 at the airplane's surface coordinates 299. And finally a third sub-unit 232 is also within the radar horizon of the airplane 290 and can detect radar signals from the airplane 290, i.e. the airplane 290 is above or just equal to the third sub-unit's 232 line of sight altitude 222 at the airplane's surface coordinates 299. An information centre to which the sub-units 230, 231, 232 are associated will thus receive information that the second 231 and third 232 sub-unit can receive radar signals from the airplane 290. The information centre will thereafter determine the spatial coordinates of the sub-units 230, 231, 232 and the surface coordinates 299 of the airplane 290. The information centre will thereafter determine the line of sight altitudes 220, 221, 222 and preferably rank them according to altitude. And finally the information centre will determine that the airplane has an altitude which is lower than the line of sight altitude 220 of the first sub-unit 230 and higher or equal to the line of sight altitude 221 of the second sub-unit 231.

Figure 3:
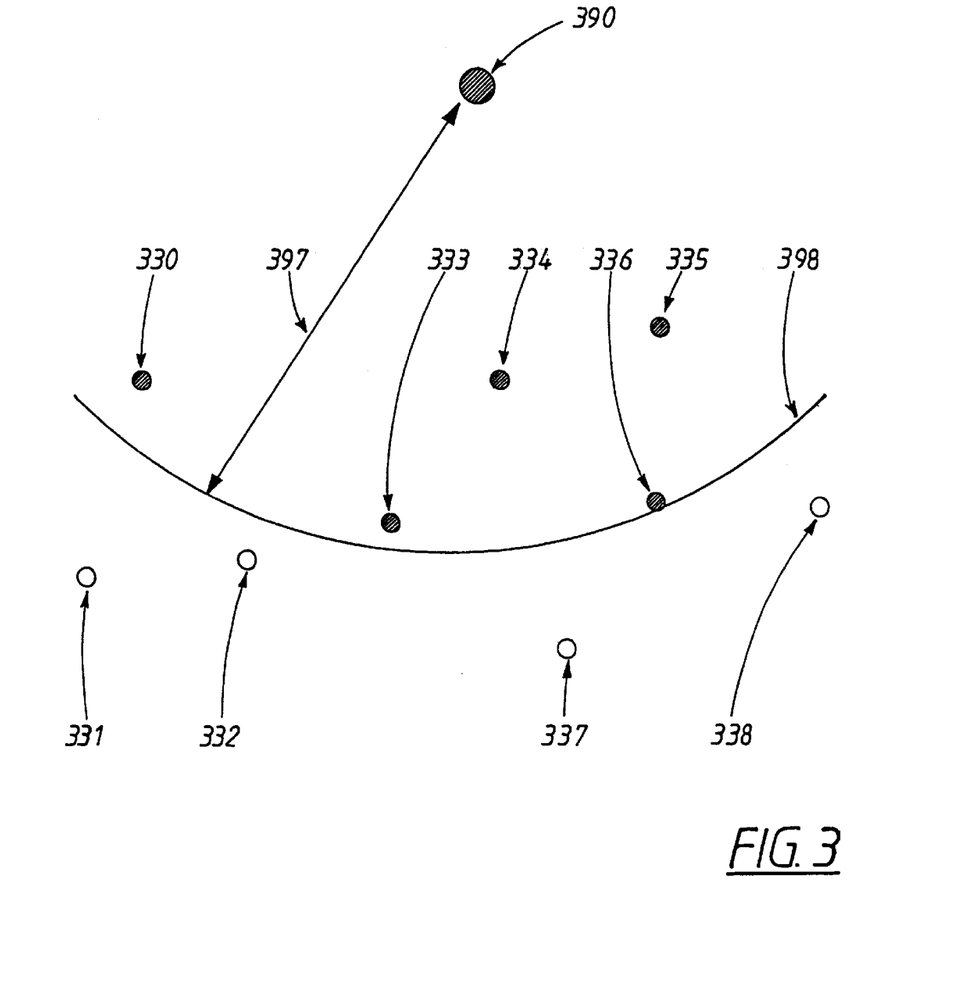
FIG. 3 illustrates a theoretical view of a system according to the invention placed in a geographical area.

FIG. 3 illustrates a theoretical view of a system according to the invention placed in a geographical area. The object of interest 390 emits electromagnetic radiation, radar signals, which ideally can be detected within a region defined by the radar horizon 398. The radar horizon 398 is a predetermined distance 397 away from the object that generates/emits the radar signals, if only the geometry is taken into account, i.e. the curvature of the earth, the altitude/height of the emitting object, and the altitude/height of the ideal sensors used. Thus, by knowing where the radar horizon is and the surface coordinates of the object 390, the altitude of the object 390 can be determined according to:

$$\text{ALTITUDE} = (Rhor)^2/(2*(4/3)*R)$$

where R is the radius of the earth and Rhor is the distance to the radar horizon. According to the invention the radar horizon 398 is determined by which sub-units 330, 333, 334, 335, 336 can detect the radar signal and which sub-units 331, 332, 337, 338 cannot. FIG. 3 does not, unfortunately, illustrate a true picture of what a radar horizon might look like when confronted with the varying geography of a real landscape, where all of the sub-units might not be located at ground level, but have varying altitudes. An alternative for determining the altitude of an object above sea level is:

$$\text{ALTITUDE} = (Rhor - \sqrt{(2*(4/3)*R*z)})^2/(2*(4/3)*R)$$

where R is the radius of the earth, Rhor is the radar horizon refered to a sensor of a sub-unit, and z is the altitude above sea level of the sensor. It is possible to select another expression for the altitude, possibly also incorporating local wave propagation conditions, i.e. taking into account meterological conditions.

Figure 4:
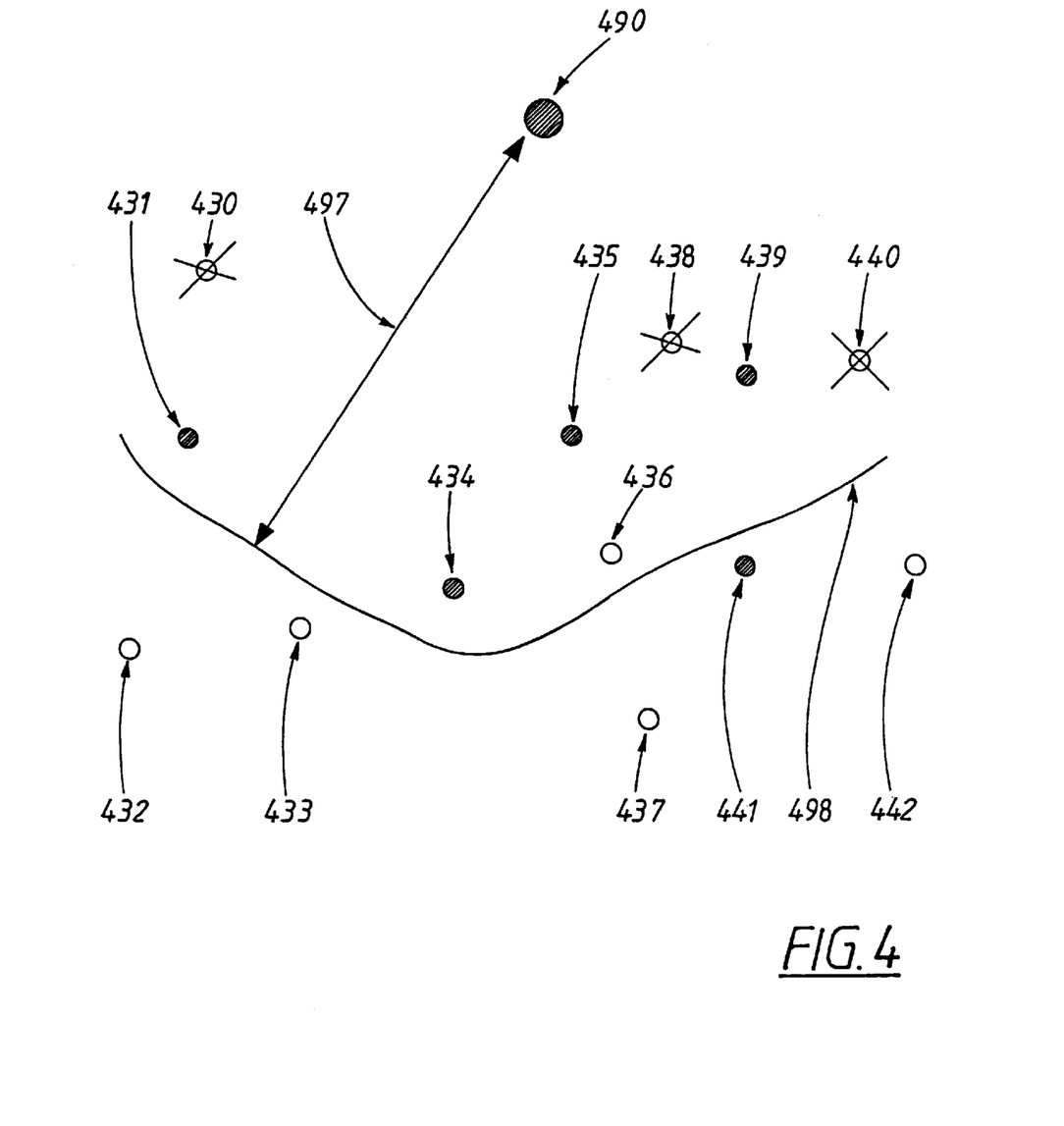
FIG. 4 illustrates a realistic view of a system according to the invention placed in a geographical area.

FIG. 4 illustrates a more realistic view of a system according to the invention placed in a geographical area. Here it can be seen that the distance 497 to a radar horizon 498 of a radar signal emitting object of interest 490, is not constant but varies. Some sub-units 430, 438, 440 are crossed out from the beginning and are not taken into account by the information centre at this specific situation. The reason they are not to be taken into consideration can be that they are hindered to detect any radar signals due to the terrain or some other reason. A more realistic situation is also that not all of the sub-units 431, 434, 435, 439, 441 that do detect radar signals are within the radar horizon 498, and not all of the sub-units 432, 433, 436 437, 442 that do not detect any radar signals are outside the radar horizon 498. Sub-units that happen to be located on or about the radar horizon will sometimes have a stochastic behaviour as to if a radar signal is detected or not. In the present example a mean/average value of the altitude represented by the sub-unit 436 that did not detect anything within the radar horizon and the altitude represented by the sub-unit 441 that did detect radar signals just outside the radar horizon, will give an acceptable altitude determination. There are of course different methods to deal with such situations.

In an ideal situation the object of interest will emit a radar signal omnidirectionally, i.e. in all directions with an equal amplitude. Unfortunately most airplanes do not use such radars, but a type of radar that scans a limited area, usually in front of the airplane. This means that only the sub-units that detect a radar signal can be used in the determination of the airplane's altitude. The sub-units that can detect the radar signals will give a minimum altitude of the airplane. Unfortunately it is not possible to limit this altitude by, for example, using the sub-unit with the lowest amplitude of the sub-units that does not detect any radar signals, because this and other sub-units might be outside of the scan area of the airplane's radar. However if the scan area of the radar can be determined then sub-units within this scan area, but possibly outside the radar horizon, that do not detect radar signals can be used to determine an upper limit of the airplane's determined altitude.

Figure 5:
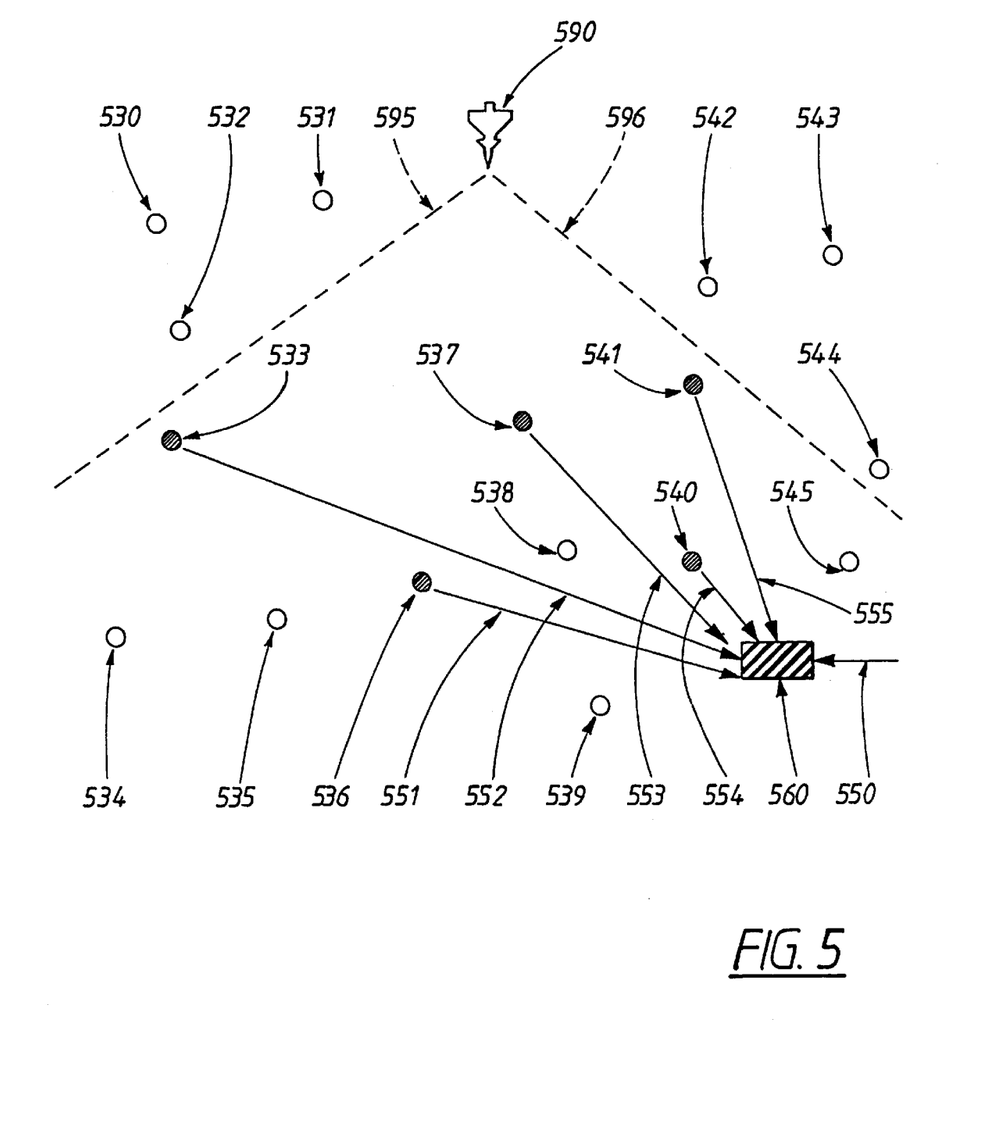
FIG. 5 illustrates a view of a further aspect of a system according to the invention placed in a geographical area.

FIG. 5 illustrates a view of a further aspect of a system according to the invention placed in a geographical area. An object of interest 590, an airplane, with a radar that scans within two end limits 595, 596 has flown into an area wherein a plurality of sub-units 530, 531, 532, 533, 534, 535, 536, 537, 538, 539, 540, 541, 542, 543, 544, 545 are scattered. The sub-units 530, 531, 532, 533, 534, 535, 536, 537, 538, 539, 540, 541, 542, 543, 544, 545 are associated with an information centre 560 with which at least sub-units 533, 536, 537, 540, 541 that can detect radar signals will communicate 551, 552, 553, 554, 555 with. The surface coordinates of the airplane 590 can, for example, either be communicated 550 to the information centre 560 from a radar outside the system, or be determined by the information centre 560 from, for example, TOA data transmitted 551, 552, 553, 554, 555 by the sub-units 533, 536, 537, 540, 541 that can detect the radar signals. The spatial coordinates of the sub-units 530, 531, 532, 533, 534, 535, 536, 537, 538, 539, 540, 541, 542, 543, 544, 545 can be predetermined when the sub-units 530, 531, 532, 533, 534, 535, 536, 537, 538, 539, 540, 541, 542, 543, 544, 545 are placed in the terrain. As an alternative one or more sub-units 530, 531, 532, 533, 534, 535, 536, 537, 538, 539, 540, 541, 542, 543, 544, 545 can comprise a GPS and/or altimetry equipment and communicate altitude (above sea level for example), surface coordinates, or spatial coordinates to the information centre 560 in dependence on the individual sub-unit. The information centre 560 preferably comprises a three dimensional map/database to be able to determine the altitude of a sub-unit when only surface coordinates of a sub-unit are communicated or predetermined. The map/databse can also be used for determining if any sub-unit is unsuitable for an object. According to this embodiment of the invention the information centre 560 determines, at least approximately, the two end limits 595, 596 of the airplane's radar scan. The information centre 560 will take the sub-units 533, 541 spaced furthest apart that can detect the radar signals and from these define the end limits of the radar scan to go through them. These defined end limits are used for the purpose of rejecting sub-units 530, 531, 532, 542, 543, 544 that are outside these boundries from being taken into any account in the further processing. The information centre 560 can then use all of the sub-units 533, 534, 535, 536, 537, 538, 539, 540, 541, 545 within this defined radar scan sector for the determination of the altitude of the airplane 590. The information centre will preferably rank these sub-units 533, 534, 535, 536, 537, 538, 539, 540, 541, 545 in question according to altitude in view of the surface coordinates of the airplane 590 and the spatial coordinates of the sub-units 533, 534, 535, 536, 537, 538, 539, 540, 541, 545. The ranking can look something like this:

sub-unit 539—altitude A
sub-unit 534—altitude B
sub-unit 535—altitude C
sub-unit 536—altitude D
sub-unit 545—altitude E
sub-unit 540—altitude F
sub-unit 538—altitude G
sub-unit 533—altitude H
sub-unit 537—altitude I
sub-unit 541—altitude J where altitude A is the highest altitude and altitude J is the lowest. The information centre 560 will then receive communication 551, 552, 553, 554, 555 from the sub-units 533, 536, 537, 540, 541 that can detect the radar signals, and the situation will then look something like this:

sub-unit 539—altitude A
sub-unit 534—altitude B
sub-unit 535—altitude C
sub-unit 536—altitude D—detected
sub-unit 545—altitude E
sub-unit 540—altitude F—detected
sub-unit 538—altitude G
sub-unit 533—altitude H—detected
sub-unit 537—altitude I—detected
sub-unit 541—altitude J—detected The information centre 560 will then have to determine the altitude of the airplane 590 from this information. It can be that the altitudes D, E, F, and G are very close, a solution would then be to take an average of all of these altitudes. If they are far apart, the information centre might determine that the sub-units 545 and 538 representing altitudes E and G should be discarded and that it is determined that the airplane 590 has a minimum altitude D and a maximum altitude C.

Figure 6:
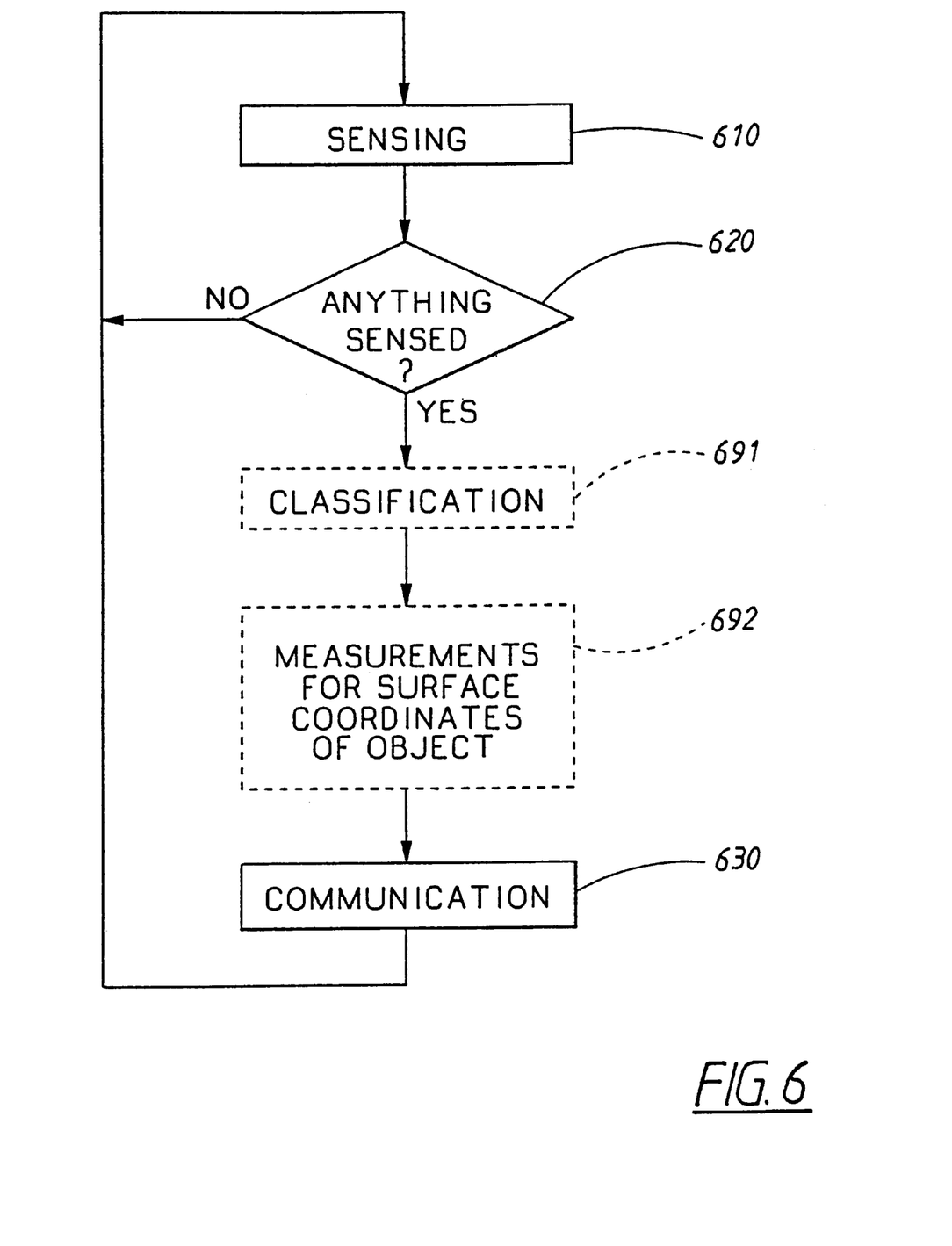
FIG. 6 illustrates a flow chart of a method according to the invention in a cell/sub-unit.

FIG. 6 illustrates a flow chart of a method according to the invention in a cell/sub-unit. A sub-unit will comprise a number of steps including a step 610 of sensing signals, a step 620 of determining if any signals are sensed, an optional step 691 of classification of the sensed signals, an optional step 692 of measuring the sensed signals for the purpose of determining the surface coordinates of an object of interest, and a step 630 of communicating with the information centre. The steps 610, 620 of sensing signals and determining if any signals are sensed can alternatively be performed continuously in the background. According to a basic method a sub-unit will sense for electromagnetic signals, radar signals, in the step 610 of sensing signals, determine if any signals are sensed in the step 620 determining and if there are signals sensed then communicate this to an information centre in a step 630 of communicating. Preferably the step 610 of sensing signal will include some sort of discrimination of only sensing for signals of interest, i.e. within a certain frequency band with certain predefined characteristics. In some embodiments of the invention the step 630 of communicating will include information of the spatial coordinates of the sub-unit. As mentioned, the method can comprise either one or both of two optional steps 691, 692. The step 691 of classification of the sensed signals will characterize the sensed signals as to, for example, one or more of either frequencies, pulse modulation, pulse length, pulse frequency, sensed level, and/or scan rate. This information is preferably communicated to the information centre as well, in order to enable a separation of different objects of interest if there are more than one that can be sensed by sub-units associated with the same information centre. The step 692 of measuring the sensed signals for the purpose of determining the surface coordinates of an object of interest will, for example, measure the time of arrival (TOA) of the sensed signals. If two sensors are used the sub-unit can also determine the direction of origin of the sensed signals. If this optional step is included then it is preferable to also communicate this information to the information centre.

Figure 7:
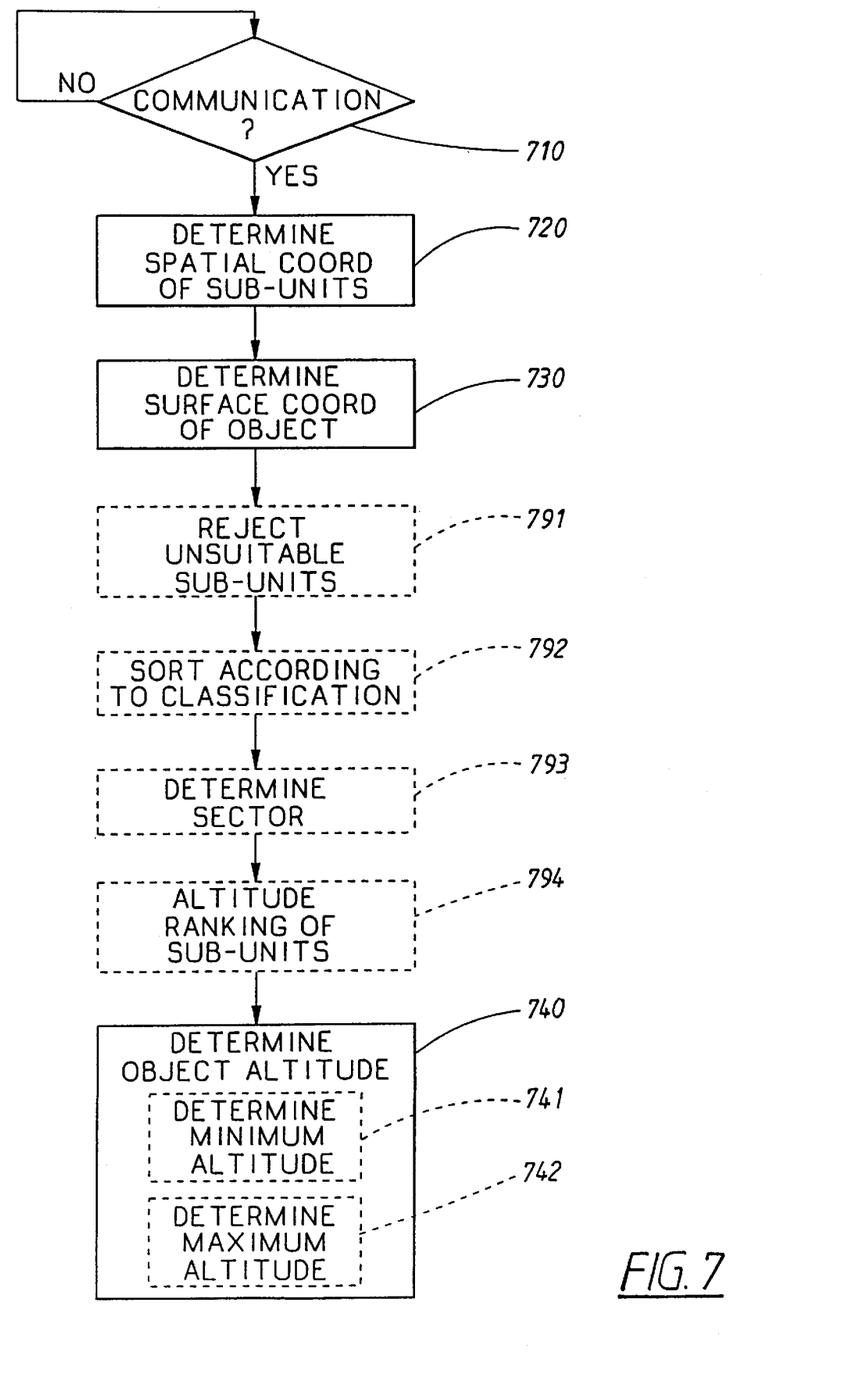
FIG. 7 illustrates a flow chart of a method according to the invention in an information centre.

FIG. 7 illustrates a flow chart of a method according to the invention in an information centre. An information centre comprises a number of necessary basic steps 710, 720, 730, 740, and can also optionally comprise a number of optional steps 791, 792, 793, 794, 741, 742. A first step 710 of receiving information can alternatively and advantageously be performed continuously as a background process. The first step will receive information that is sent to the information centre and then pass it along for further use. In a second step 720 the information centre determines the spatial coordinates of the sub-units which are associated with the information centre. This can, for example, be determined during installation of the system, be determined when a sub-unit is moved, and/or be determined by information communicated from a sub-unit in question. In a third step 730 the surface coordinates of the object or objects of interest are determined. As mentioned previously this might be determined in view of information received from a radar or from information received from a number of sub-units. In a first optional step 791 unsuitable sub-units are rejected from any further processing. The rejection will preferably be in dependence on the determined spatial coordinates of the sub-units, the surface coordinates of the object, and/or knowledge of the terrain. In a second optional step 792 information from the sub-units are sorted according to any additional classification information received from the sub-units. In a third optional step 793 a sector of radar scanning is determined in dependence on which sub-units can detect any radar signals and the geometry of the sub-units and the object in question. In a fourth optional step 794 all of the sub-units which are not rejected are ranked according to their, calculated from their respective spatial coordinates, line of sight altitude at the surface coordinates of the object. And finally in a fourth step 740 the altitude of the object in question is determined. Optionally the fourth step can include either one or both of two sub-steps 741, 742. In the first optional sub-step 741 a minimum altitude of the object is determined in dependence of which sub-units have communicated that they can detect the radar signals. In the second optional sub-step 742 a maximum altitude of the object is determined in dependence of which sub-units within a scan sector cannot detect the radar signals.

Figure 8:
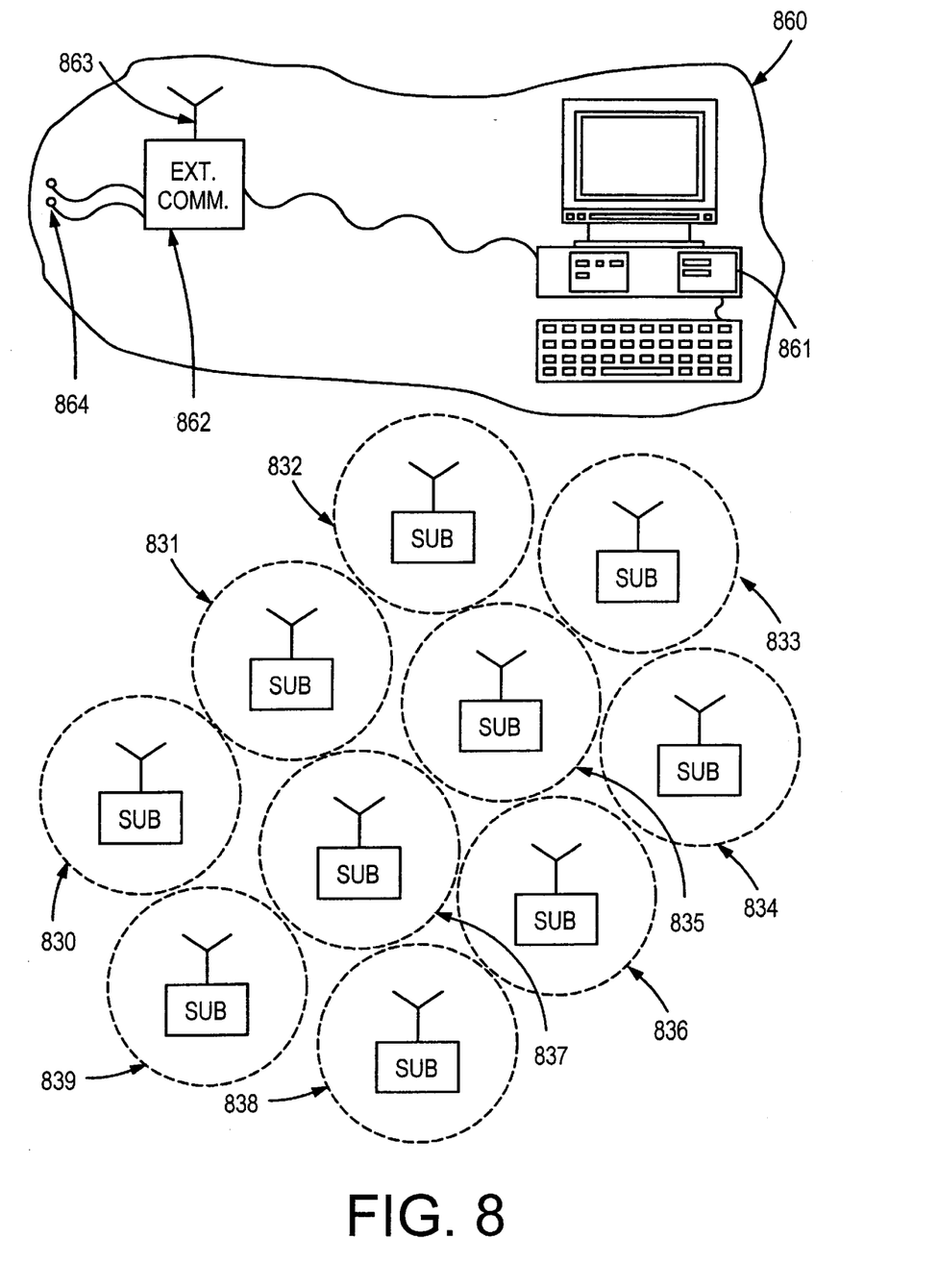
FIG. 8 illustrates a block diagram of a system according to the invention.

In FIG. 8, a diagrammatic block diagram of a system according to the present invention is illustrated. The system is composed of a central unit 860, the information centre, and a large number of sub-units 830–839, also called cells, with which the information centre 860 is at least communicated with. The sub-units 830–839 are placed or installed in the geographical area which it is desired to watch over and/or monitor. Sub-units 830–839 which are linked to an information centre 860 and which have a distinctive feature, for example are located in a defined area, have a determined design or have a uniform and specific task, can be arranged in a group according to one or some of these criteria. This is so that, among other things, it is possible for commands to be given to a number of sub-units simultaneously in a simple manner which means time savings in the data transfer between information centre and sub-unit in systems with two-way communication. Additionally it will usually also produce a more easily understandable system.

The information centre 860 comprises a data processor 861, which may be a PC or another data processor comprising program and data memory, input and output devices which can, for example, be a keyboard and a monitor. The information centre 860 is furthermore prepared for external communication 862. This communication 862 can take place either in a wireless manner via antenna 863 or via wire 664 and be of a type for one-way or a type for two-way communication. If the communication with the sub-units 830–839 takes place in a wireless manner, this can take place to a radio network, for example of the GSM or NMT type, or directly to the sub-units 830–839. If, on the other hand, the communication takes place via wire 864, this can take place to a telephone network, public or private, and then if appropriate via a radio network, for example GSM or NMT, or via wire directly to the sub-units 830–839. Wire is be understood as meaning both optical and electrical conductor. In certain applications, it may be suitable to use other suitable communication networks.

The sub-units 830–839 are each linked to the information centre 860 via data communication means. All sub-units 830–839 preferably have an identificiation designation—an address/address code—which is unique for each sub-unit. Correspondingly, each group of sub-units 830–839 linked to one and the same information centre 860, in the systems which have divided all or certain sub-units into one or more groups, preferably has a given group identification—a group address/group address code—which is to be found in each sub-unit and is the same for all sub-units 830–839 which belong to the same group. Furthermore, it is also possible to have a system identification—a system address/system address code—which is common to all sub-units 830–839 which belong to the same system. There may be a number of systems which are operational at the same time and, in order that information and commands do not end up in the wrong place, this system identification/system address affords a possibility of distinguishing between different systems.

The address code of a sub-unit and if appropriate of the group, is preferably used in all communication between information centre and sub-unit as call address(es), and in communication between sub-unit and information centre as identifier of the individual sub-unit or the group.

Figure 9:
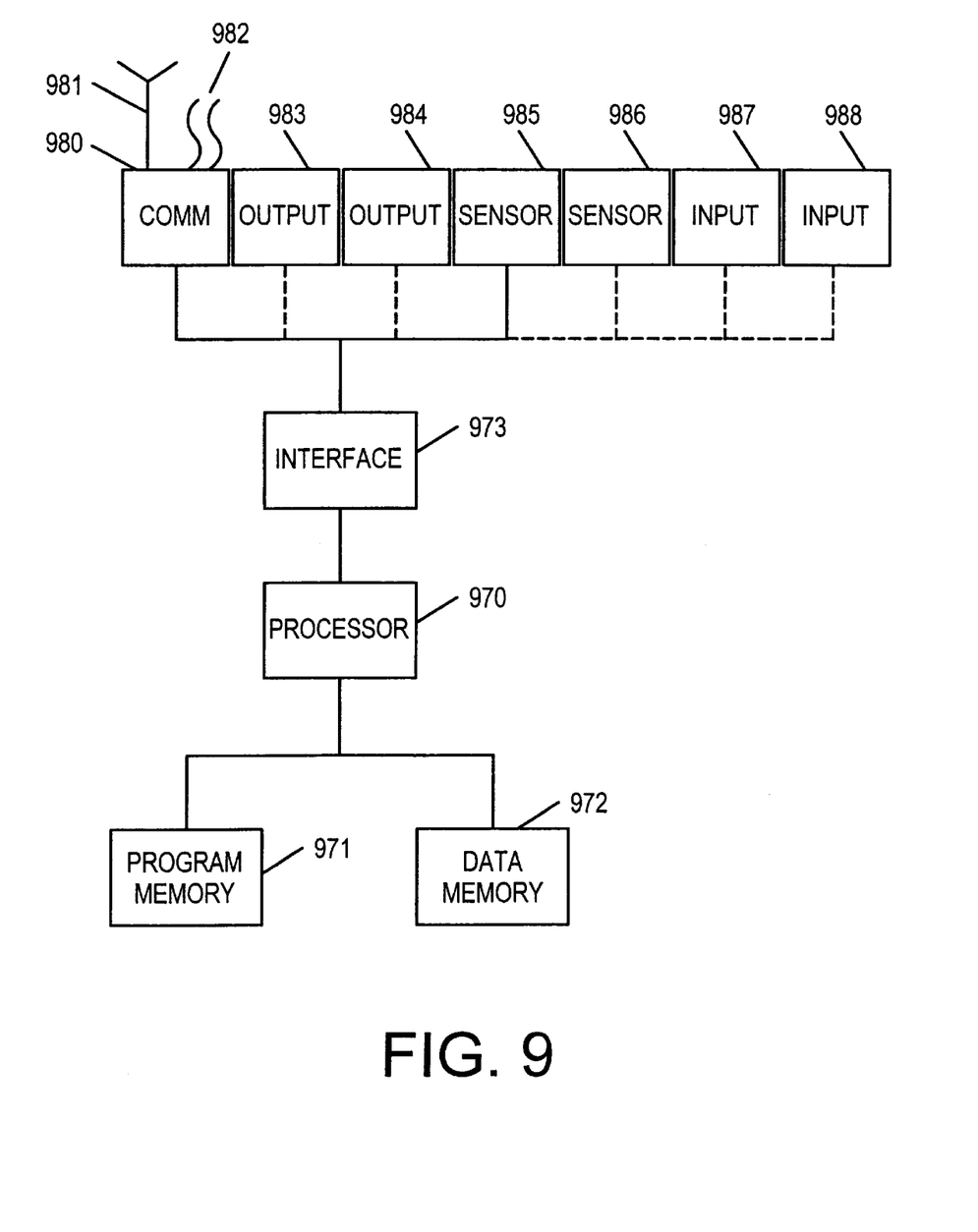
FIG. 9 illustrates a block diagram of an embodiment of a cell/sub-unit according to the invention.

FIG. 9 illustrates a block diagram of an embodiment of a sub-unit/cell according to the invention. Each sub-unit is provided with one or more sensors 985, 986. At least one of the sensors 985 is intended to receive and detect electromagnetic radiation, preferably radar signals. The other optional sensor 986 can be intended to receive and detect other types of signals, but will preferably also be a sensor for electromagnetic radiation, and specifically radar signals within the microwave frequency range. If two sensor for radar signals are used, then these can act in combination to detemine a direction to an emitting object by means of time of arrival measurements. The response of the sub-unit to signals with a certain signal profile being sought within the area of sensitivity of the respective sensor 985, 986 is defined within the sub-unit. The signal profile may for example comprise one or more of frequencies, pulse modulation, pulse length, coding or pulse repetition frequency. A given radar transmitter, the characteristics of which have been indicated in frequencies, pulse modulation, pulse length, pulse repetition interval, can thus be discovered and identified by the sub-units for report to the information centre.

The sub-units also comprise processing means which comprises a processor arrangement 970 with program memory 971 and data memory 972 in order to make it possible for the sub-unit to function properly. The program memory 971 can comprise programs for basic functions in the sub-unit such as communication. The program memory 971 can additionally comprise one or more function programs which define how the sub-unit will behave in relation to its environment. When the program memory 971 comprises a number of function programs, selection between these can be made before the sub-units are placed, by clock control or by commands via communication with the information centre. There can also be additional space in the program memory 971 for the possibility of adding a number of function programs to the program memory 971, i.e. the program memory is programmable or reprogrammable. This can then be carried out from the information centre via the communication means. This affords a possibility of changing the setting of or improving the tasks which have been placed on a sub-unit.

Also linked to the processor arrangement 970 of a sub-unit is an interface arrangement 973. The interface arrangement 973 adapts/interfaces signals to and from the processor arrangement 970 with a communication arrangement 980, one or more sensors 985, 986, possibly one or more output arrangements 983, 984, and possibly, in addition to the sensor or sensors 985, 986, a further one or more input arrangements 987, 988.

The communication arrangement 980 may be of a type for one-way or a type for two-way communication or a combination of both. A sub-unit has at least to be able to communicate to an information centre. The communication method may be performed either in a wireless manner via antenna 981 to a radio network, for example GSM or NMT, or directly to the information centre, or via wire 982 to a public or private telephone network or directly to the information centre. The one or more output arrangements 983, 984, if present, can in their simplest form be an electrical signal which in turn controls an external arrangement of some type. The output arrangements can, as an example, also comprise sound sources, light sources or electromagnetic interference sources such as jammers.

In a practical realization of the present invention it is preferable that country-wide infrastructures existing in the community are used for data communication between the sub-units and the information centre. In most applications of the invention, it is sufficient that the data transfer rate between sub-units and information centre and vice versa is low and not of a real time nature.

The system is designed so that the sub-units, with great freedom in the selection of place, can be positioned for example in an area of terrain. This freedom is achieved due to a low power consumption and the possibility to use a wireless data transfer. The low power consumption means that power can be provided by batteries and/or solar cells.

The present invention can be put into apparatus-form either as pure hardware, as pure software or as a combination of hardware and software. If the method according to the invention is realised in the form of software, it can be completely independent or it can be one part of a larger program. The software can suitably be located in a general purpose computer or in a dedicated computer.

As a summary, the invention can basically be described as an efficient system and method for determining an altitude of an airplane that emits radar signals.

The invention is not limited to the embodiments described above but may be varied within the scope of the appended patent claims.

FIG. 1
100 radius of curvature
110 (radar) horizon range
120 height/altitude at horizon range
130 sensor/cell/sub-unit
190 object 1/airplane altitude 1
191 object 2/airplane altitude 2
199 surface coordinates of airplanes 190, 191
FIG. 2
210 horizon range sensor 230
211 horizon range sensor 231
212 horizon range sensor 232
220 altitude horizon range 210
221 altitude horizon range 211
222 altitude horizon range 212
2221 altitude horizon range 212 wrong object distance
230 non-active sensor/cell/sub-unit
231 active sensor/cell/sub-unit
232 active sensor/cell/sub-unit
290 object/airplane
299 surface coordinates of airplane 290
FIG. 3
330 active sensor/cell/sub-unit
331 non-active sensor/cell/sub-unit
332 non-active sensor/cell/sub-unit
333 active sensor/cell/sub-unit
334 active sensor/cell/sub-unit
335 active sensor/cell/sub-unit
336 active sensor/cell/sub-unit
337 non-active sensor/cell/sub-unit
338 non-active sensor/cell/sub-unit
390 object/airplane
397 radar horizon range
398 radar horizon
FIG. 4
430 disabled non-active sensor/cell/sub-unit
431 active sensor/cell/sub-unit
432 non-active sensor/cell/sub-unit
433 non-active sensor/cell/sub-unit
434 active sensor/cell/sub-unit
435 active sensor/cell/sub-unit
436 non-active sensor/cell/sub-unit
437 non-active sensor/cell/sub-unit
438 disabled non-active sensor/cell/sub-unit
439 active sensor/cell/sub-unit
440 disabled non-active sensor/cell/sub-unit
441 active sensor/cell/sub-unit
442 non-active sensor/cell/sub-unit
490 object/airplane
497 radar horizon range 498 rada horizon
FIG. 5
530 non-active sensor/cell/sub-unit
531 non-active sensor/cell/sub-unit
532 non-active sensor/cell/sub-unit
533 active sensor/cell/sub-unit
534 non-active sensor/cell/sub-unit
535 non-active sensor/cell/sub-unit
536 active sensor/cell/sub-unit
537 active sensor/cell/sub-unit
538 non-active sensor/cell/sub-unit
539 non-active sensor/cell/sub-unit
540 active sensor/cell/sub-unit
541 active sensor/cell/sub-unit
542 non-active sensor/cell/sub-unit
543 non-active sensor/cell/sub-unit
544 non-active sensor/cell/sub-unit
545 non-active sensor/cell/sub-unit
550 communication of surface coordinates of object
551 communication of active sensor 536
552 communication of active sensor 533
553 communication of active sensor 537
554 communication of active sensor 540
555 communication of active sensor 541
560 information centre
590 object/airplane
595 angular limit of the search of the radar of the object
596 angular limit of the search of the radar of the object
FIG. 6
610 sensing electromagnetic radiation by means of passive electromagnetic radiation sensor(s)
620 determining if electromagnetic radiation is sensed
630 communicating to the information centre about sensed electromagnetic radiation
691 optional classification of sensed electromagnetic radiation according to one or more of either the frequencies, pulse modulation, pulse repetition frequency, pulse length, or sensed level
692 optional measurement of sensed electromagnetic radiation for the purpose of determining the surface (X, Y) coordinates of the object, for example by time of arrival measurements
FIG. 7
710 receiving communication from sub-units
720 determine the (X, Y, Z) spatial coordinates of the sub-units
730 determine the (X, Y) surface coordinates of the object
740 determine altitude, Z coordinate, of the object
741 optional determining of the minimum altitude of the object
742 optional determining of the maximum altitude of the object
791 optional rejection of unsuitable sub-units
792 optional determining which sub-units have substantially the same classification and only using these for the altitude determination
793 optional determining a sector used for maximum altitude determination
794 optional ranking the sub-units according to altitude
FIG. 8
830 sensor/cell/sub-unit
831 sensor/cell/sub-unit
832 sensor/cell/sub-unit
833 sensor/cell/sub-unit
834 sensor/cell/sub-unit
835 sensor/cell/sub-unit
836 sensor/cell/sub-unit
837 sensor/cell/sub-unit
838 sensor/cell/sub-unit
839 sensor/cell/sub-unit
860 information centre
861 processor means
862 communication means
863 antenna
864 wires
FIG. 9
970 processor means
971 program memory
972 data memory
973 interface means
980 communication means
981 antenna
982 wires
983 optional I/O means
984 optional I/O means
985 sensor
986 optional sensor
987 optional input means
988 optional input means

What is claimed is:

1. A method of determining an object's altitude in relation to a predetermined altitude reference level using an information center in communication with a plurality of sub-units having known spatial coordinates, each sub-unit including at least one passive electromagnetic radiation sensor, the method comprising the following steps:

in each sub-unit, determining if electromagnetic radiation from an object is sensed, and if it is determined that electromagnetic radiation is sensed, then transmitting a signal to the information center indicating that electromagnetic radiation has been sensed, and the method further comprising the following steps in the information center:

receiving from sub-units a signal indicating that they have sensed electromagnetic radiation, determining surface coordinates of the object, and based on which sub-units have communicated that they have sensed electromagnetic radiation, determining in relation to the predetermined altitude reference level an altitude of the object.

2. The method of claim 1, wherein the steps in the information center further include the steps of:

determining line of sight horizon altitudes, in relation to the determined surface coordinates of the object, of each sub-unit based on the respective determined spatial coordinates of each sub-unit; and ranking the sub-units according to the determined line of sight horizon altitudes, which ranking is used in the step of determining the altitude of the object.

3. The method of claim 1, wherein in the information center the step of determining an altitude of the object comprises the step of determining a minimum altitude of the object by determining which subunit or sub-units that have sensed electromagnetic radiation are just within the line of sight horizon of the object.

4. The method of claim 1, wherein the steps in the information center further include the steps of:

rejecting sub-units at determined spatial coordinates that are unsuitable for the object at the determined surface coordinates; and rejecting these sub-units from being taken into any further consideration for the object at the determined surface coordinates.

5. The method of claim 1, wherein each sub-unit further comprises the step of classifying sensed electromagnetic radiation according to at least one of frequencies, pulse modulation, pulse repetition frequency, pulse length, and sensed level, and the step of communicating to the information center includes communicating a classification of the sensed electromagnetic radiation, and in the information center the step of determining an altitude of the object is only done based on sub-units that have communicated that they have sensed electromagnetic radiation with at least substantially the communicated classification.

6. The method of claim 1, wherein the steps in the information center further include the step of determining a maximum altitude of the object by determining which sub-unit or sub-units within a sector in which the object emits electromagnetic radiation are beyond the line of sight horizon of the object.

7. The method of claim 6, wherein the steps in the information center further include the step of determining the sector in which the object emits electromagnetic radiation by setting limits of the sector in view of which sub-units have communicated that they have sensed electromagnetic radiation.

8. The method of claim 1, wherein each sub-unit further comprises the step of measuring sensed electromagnetic radiation to determine the surface coordinates of the object, and the step of communicating to the information center also comprises communicating the result of the measuring sensed electromagnetic radiation step, and in the information center the step of determining the surface coordinates of the object includes the step of using the communicated result of measuring sensed electromagnetic radiation from the sub-units and the determined spatial coordinates of the sub-units when determining the surface coordinates of the object.

9. A system for determining an object's altitude, in relation to a predetermined altitude reference level, comprising:

an information center in communication with a plurality of sub-units;

each sub-unit having at least one passive electromagnetic radiation sensor and means for determining if the passive electromagnetic radiation sensor has sensed electromagnetic radiation from an object, and means for transmitting a signal to the information center indicating that electromagnetic radiation has been sensed;

wherein the information center comprises means for determining spatial coordinates of the sub-units, means for determining surface coordinates of the object, and means for determining, based on which sub-units have communicated that they have sensed electromagnetic radiation, an altitude of the object in relation to the predetermined altitude reference level.

10. The system of claim 9, wherein the information center further comprises means for determining for each sub-unit a line-of-sight-horizon altitude, in relation to the determined surface coordinates of the object, and means for ranking the sub-units according to their determined line-of-sight-horizon altitudes, which ranking is used by the altitude determining means.

11. The system of claim 9, wherein in the information center the altitude determining means determines a minimum altitude of the object by determining which subunit or sub-units that have sensed electromagnetic radiation are just within the line-of-sight horizon of the object.

12. The system of claim 9, wherein the information center further comprises means for rejecting subunits at determined spatial coordinates unsuitable for the object at determined surface coordinates, wherein the rejected sub-units are excluded from further consideration for the object at the determined surface coordinates.

13. The system of claim 9, wherein each sub-unit further comprises means for classifying sensed electromagnetic radiation according to at least one of frequency, pulse modulation, pulse repetition frequency, pulse length, or sensed level; subunit communicates to the information center the classification of the sensed electromagnetic radiation; and in the information center the altitude determining means determines the altitude of the object based on only sub-units that have communicated that they have sensed electromagnetic radiation with at least substantially the communicated classification.

14. The system of claim 9, wherein in the information center the altitude determining means determines a maximum altitude of the object by determining which sub-unit or sub-units within a sector in which the object emits electromagnetic radiation are beyond the line-of-sight horizon of the object.

15. The system of claim 14, wherein the information center further comprises means for determining a sector in which the object emits electromagnetic radiation by setting limits of the sector in view of which sub-units have communicated that they have sensed electromagnetic radiation.

16. The system of claim 9, wherein each sub-unit further comprises means for measuring sensed electromagnetic radiation to determine the surface coordinates of the object; each sub-unit communicates a result generated by the measuring means; and in the information center, the object surface coordinate determining means uses communicated results from sub-units and the determined spatial coordinates of sub-units in determining the surface coordinates of the object.

17. A method for determining an altitude of an object, comprising:

(a) providing a plurality of geographically dispersed sub-units, each sub-unit having at least one sensor for detecting a radar signal emitted from the object, and a transmitter for transmitting a signal to an information center, the signal indicating whether the sub-unit has detected a radar signal;

(b) determining, at the information center, spatial coordinates of the sub-units;

(c) receiving, at the information center, signals from a plurality of sub-units;

(d) in response to a signal indicating that at least one sub-unit has detected a radar signal, determining, at the information center, a set of sub-units that detected the radar signal;

(e) determining the surface coordinates of the object;

(f) determining the line-of-sight altitude at the surface coordinates of the object of the sub-units that detected the radar signal;

(g) ranking the set of sub-units according to the line-of-sight altitude at the surface coordinates of the object; and (h) determining the altitude of the object using the line-of-sight altitudes of the sub-units at the surface coordinates of the object.

18. A method according to claim 17, further comprising: repeating steps (c) through (h).

19. A method according to claim 17, wherein the step of determining the altitude of the object using the line-of-sight altitudes of the sub-units at the surface coordinates of the object comprises:

determining the object's minimum altitude as indicated by the sub-unit having the lowest line-of-sight altitude at the surface coordinates of the object that detected a radar signal from the object; and determining the object's maximum altitude as indicated by the sub-unit having the lowest line-of-sight altitude at the surface coordinates of the object that has not detected a radar signal from the object.

* * * * *